United States Patent [19]
Räder et al.

[11] Patent Number: 5,730,927
[45] Date of Patent: Mar. 24, 1998

[54] PROCESS AND APPARATUS FOR PRODUCING HOLLOW BODIES OF THERMOPLASTIC MATERIAL

[75] Inventors: Günter Räder, Kettenhausen; Karl Heinz Fey, Bornheim; Hans-Dieter Lesch, Bonn; E. Manfred Gernant, Troisdorf, all of Germany

[73] Assignee: Kautex Werke Reinold Hagen Aktiengesellschaft, Bonn, Germany

[21] Appl. No.: 612,355

[22] Filed: Mar. 7, 1996

[30] Foreign Application Priority Data

Mar. 10, 1995 [DE] Germany .................. 195 08 525.6

[51] Int. Cl.⁶ .................. B29C 49/56; B29C 49/04
[52] U.S. Cl. .................. 264/523; 425/451.2; 425/451.9; 425/541; 264/540
[58] Field of Search .................. 425/541, 451.2, 425/451.9, 150; 264/40.5, 523, 540

[56] References Cited

U.S. PATENT DOCUMENTS

| | | | |
|---|---|---|---|
| 3,559,235 | 2/1971 | Hagen | 425/541 |
| 3,829,264 | 8/1974 | Mnilk et al. | 425/149 |
| 4,427,360 | 1/1984 | Albrecht et al. | 425/541 |
| 4,822,274 | 4/1989 | Chan et al. | 425/541 |
| 4,832,592 | 5/1989 | Saumsiegle | 425/541 |
| 4,944,669 | 7/1990 | Zakich | 425/589 |

FOREIGN PATENT DOCUMENTS

| | | | |
|---|---|---|---|
| 2 659 265 | 9/1991 | France . | |
| 2-92617 | 4/1990 | Japan | 425/541 |
| 758480 | 10/1956 | United Kingdom . | |
| WO 81/01679 | 6/1981 | WIPO | 425/541 |

Primary Examiner—Robert Davis
Attorney, Agent, or Firm—Seidel, Gonda, Lavorgna & Monaco, PC

[57] ABSTRACT

A process and an apparatus for producing hollow bodies of thermoplastic material by a blow molding procedure use a blow molding mold comprising at least two portions, with at least one means by which the mold portions are urged towards each other in the mold-closing direction and are locked together when the mold is closed. The locking means carries a large part of the forces resulting from the blow molding pressure and possibly also at least a part of the forces required for squeezing surplus material off the preform to be expanded in the mold. The forces applied by the locking means are transmitted to the mold portions, with the interposition of at least two spaced-apart hydraulic force-transmitting means. The hydraulic force-transmitting means are hydraulically connected together in order to render uniform the forces which act on the mold portions.

27 Claims, 7 Drawing Sheets

PROCESS AND APPARATUS FOR PRODUCING HOLLOW BODIES OF THERMOPLASTIC MATERIAL

FIELD OF THE INVENTION

The invention concerns a process and an apparatus for producing hollow bodies of thermoplastic material by a blow molding procedure, using a blow molding mold which comprises at least two mold portions.

BACKGROUND OF THE INVENTION

Blow molding molds and more particularly those which are used in an extrusion blow molding procedure are generally of a multi-part and in particular two-part construction. The mold portions are respectively movable relative to each other between a position in which the blow molding mold is open and a position in which the blow molding mold is closed. In many cases, hydraulic piston-cylinder units are provided for the opening and closing movements of the mold. In such a situation, a piston-cylinder unit can be associated with each mold portion. It is however also possible for a common piston-cylinder unit to be associated with both mold portions. Mechanical drive means, for example one or more screw spindles, may also be provided for producing the movement of the mold portions between the open and closed positions of the mold.

It will be noted at this point that reference may be made hereinafter to blow molding mold halves, as in very many cases the blow molding mold is subdivided symmetrically and is thus subdivided into first and second halves. Such a reference to mold halves however is not intended to constitute a limitation to blow molding molds which are subdivided into halves as on the contrary the invention may also be used in those situations in which the blow molding mold is subdivided asymmetrically and may possibly also be divided into more than two portions.

In connection with a process for the production of hollow bodies from thermoplastic material using a blow molding procedure, U.S. Pat. No. 4,594,067 discloses means for mechanically locking a blow molding mold in its closed position. As the increased pressure which is required for expansion of the preform in the blow molding mold gives rise to considerable forces which act on the mold portions and the magnitude of which generally increases with the magnitude of the hollow body to be produced and therewith also with the magnitude of the mold, the mechanical locking action serves in particular to relieve the drive means for producing the opening and closing movements, of the loads caused by the forces generated by the blow molding pressure, especially as it is then generally possible to use smaller drives for producing the opening and closing movements of the mold.

For the purposes of mechanically locking the blow molding mold portions in the closed position, in the majority of cases components of at least one locking system are mounted on the blow molding mold portions or on generally plate-like holders carrying the mold portions, or on other elements which are directly or indirectly connected to the blow molding mold. In the last phase of the closing movement, coupling members of those components of the locking system are brought into engagement with each other to hold the mold in the closed condition. In that case, the locking system applies forces which act in the closing direction of the blow molding mold portions and which lock and brace the two mold portions relative to each other. In many cases moreover the locking system is also used in the last phase of the closing procedure to move the two mold portions into the definitive mold-closed position. In that last phase of the closing procedure, when performing an extrusion blow molding process, surplus pieces of material are also severed from the preform in the mold. The high forces which are required for that purpose can also be applied by the locking system, as is also described in U.S. Pat. No. 4,594,067.

As the locking arrangement and thus the forces which are transmitted thereby act on the components carrying them in a more or less punctiform fashion, at any event when disadvantageous circumstances occur the closure plates or the mold-holding plates suffer from bending under the effect of the forces which are transmitted by the locking arrangement. That is also to be attributed to the fact that those forces are operative outside the closing surface of the blow molding mold portions, that is to say they are eccentric with respect to the mold. Even a minor degree of bending of at least one of the mold holding plates has the result that the mold portions do not come to bear uniformly against each other at their separation surface, with the result that the mold does not close satisfactorily. That inevitably results in detrimental effects on the quality of the blow-molded article.

If furthermore in the last phase of the closing movement, in addition to the drive provided for the opening and closing movements, the locking arrangement moves the two mold portions towards each other and in so doing at least assists with the procedure for squeezing off surplus material from the preform, there is in addition the danger that the squeezing-off effect does not take place everywhere in a uniform manner along the periphery of the mold cavity or parts of the periphery of the mold cavity. Such undesirable effects which also occur due to flexing of the mold-holding plates increase with the size of the mold and therewith also the size of the mold holding plates. Such effects occur not only in the case of blow molding molds for producing large hollow bodies, for example fuel tanks and the like. On the contrary, those problems are also to be expected in relation to those blow molding molds which serve for the production of relatively small hollow bodies but which are provided with a very large number of mold cavities so that the overall result is also a large blow molding unit with correspondingly large mold holding plates. It will be appreciated that the extent of such flexing, as measured in terms of absolute values, is normally very slight. It will normally only be in the region of a few millimeters. That however may be sufficient to give rise to the undesirable effects already described above.

It is admittedly known that the above-described disadvantageous consequences can be at least markedly reduced by making the mold holding plates of suitably large dimensions. That however results in a correspondingly large amount of material being employed, and it also results in the movable parts of the mold and the entire closing support frame which carries the mold being of great weight.

SUMMARY OF THE INVENTION

An object of the present invention is to provide a process for the production of hollow bodies of thermoplastic material by a blow molding procedure using a blow molding mold comprising at least two portions, wherein the above-described disadvantages of the prior procedures can be at least substantially reduced.

Another object of the present invention is to provide a process for producing hollow bodies of thermoplastic material from a preform, which can be carried into effect in a smooth uniform fashion so as to afford improved operating results.

Still another object of the present invention is to provide an apparatus for producing hollow bodies of thermoplastic material by a blow molding procedure, which is so designed that forces applied to blow molding mold portions do not result in significant irregularities in terms of the forces with which the mold portions are pressed against each other in the closing direction, although the components of the arrangement for holding the mold portions together are arranged beside and/or below and above the mold.

In accordance with the invention, in terms of the process, the foregoing and other objects are attained by a process for the production of hollow bodies of thermoplastic material from a preform by a blow molding procedure, using a blow molding mold comprising at least first and second portions, and at least one drive means by which the blow molding mold portions are moved between a mold-open position in which the mold is opened and a mold-closed position in which the mold is closed, and using at least one locking means by which the mold portions are acted upon by forces acting in the mold-closing direction and are locked together at the latest when the mold is in the closed position. At least one portion of the locking means is associated with each of the mold portions to be locked together, and said portions of the locking means are brought into engagement with each other by way of releasable coupling members. The forces applied in the closing direction by the locking means are transmitted to at least one of the mold portions, with the interposition of at least first and second hydraulic force-transmitting means which are disposed at a spacing from each other. The at least first and second hydraulic force-transmitting means are hydraulically connected together.

The force-transmitting means are preferably in the form of piston-cylinder units whose pistons can perform only a short stroke movement which for example may be only a few millimeters. When the components of the locking means are disposed for example laterally beside the blow molding mold portions, the hydraulic force-transmitting means could be arranged along at least one substantially horizontal line, in which case a respective transmission means would be arranged near each one of the lateral boundaries of the mold or the mold holding plate and a transmission means would be arranged approximately in the central region between the first and second lateral transmission means. As the locking means acts near the two lateral boundaries of the mold portions or the respective mold holding plate, the two laterally arranged force-transmitting means, by virtue of the bending of the mounting plate which begins under the action of the forces, would be more heavily loaded with the consequence that a corresponding part of the hydraulic fluid is displaced out of those lateral force-transmitting means by way of the connecting lines into the central force-transmitting means so that the piston thereof is subjected to a correspondingly greater force by the action of the hydraulic fluid and that results in the overall application of force to the blow molding mold being rendered uniform over the width thereof. Therefore a pressure equalization effect occurs by virtue of the hydraulic communication of the force-transmitting means associated with that system, with the consequence that the forces acting on the blow molding mold portion are correspondingly equalized.

Normally it will be desirable and under some circumstances even necessary for such force-transmitting means to be associated with all mold portions, as normally the forces acting on the two or more mold portions are the same in terms of their magnitude and only differ from each other in respect of their direction.

In accordance with the present invention, in regard to the apparatus, the foregoing and other objects are attained by an apparatus for producing hollow bodies of thermoplastic material in a blow molding procedure, comprising a closure support means for a blow molding mold comprising at least first and second portions, and at least one drive means for moving the mold portions between a mold-open position in which the mold is open and a mold-closed position in which the mold is closed. The apparatus further has at least one locking means by which the mold portions are acted upon by forces acting in the mold-closing direction and are locked together at latest when the mold is in the closed position. At least a portion of the locking means is associated with each of the mold portions to be locked together and the portions of the locking means are in engagement with each other by way of releasable coupling members in the mold-closed position. The apparatus further includes at least first and second hydraulic force-transmitting means which are disposed at a spacing from each other, the arrangement being such that the forces applied in the mold-closing direction by the locking means are transmitted to at least one of the mold portions by way of the hydraulic force-transmitting means. The apparatus further includes means hydraulically connecting the hydraulic force-transmitting means together.

In a preferred feature of the invention each of the mold portions is carried by a mold holding plate and the locking means is connected to the mold holding plates and the hydraulic force-transmitting means are arranged at least between a mold portion and the mold holding plate carrying same.

The invention further provides in a preferred feature that there are at least two groups of such force-transmitting means, of which the force-transmitting means of each group are hydraulically connected together. The use of more than one group of force-transmitting means will be particularly desirable when the mold portions are of a very great extent in at least one direction, and it is important in particular to ensure that the mold-closing forces are rendered uniform in the above-described manner, for example in the upper and lower regions of the mold, that is to say at locations where, in the majority of cases, surplus material has to be squeezed off the preform in the mold.

In accordance with another preferred feature of the invention at least two spaced-apart transverse carriers are associated with at least one of the mold holding plates, and a group of hydraulic force-transmitting means is associated with each carrier. It may be desirable in that arrangement for the force-transmitting means and the transverse carrier to be mounted displaceably in such a way as to permit adaptation to different sizes or configurations of the blow molding mold. In many cases, a blow molding apparatus will be used at different times for producing different blow-molded articles. That presupposes that, after termination of the production of a specific article, the blow molding mold portions used for that purpose have to be replaced by other blow molding mold portions in which for example the squeeze-off edges, that is to say the edges in-the mold which serve to squeeze surplus material off the preform, are at a different position in respect of height, than in the blow molding mold that was used previously. In that case it may be advantageous for the force-transmitting means to be so arranged that they can be adapted in respect of their position to the position of specific squeeze-off regions.

Further objects, features and advantages of the invention will be apparent from the following description of preferred embodiments of the invention.

DESCRIPTION OF PREFERRED EMBODIMENTS

Referring generally to the drawing, the blow molding apparatus illustrated therein, for producing hollow bodies of thermoplastic material using a blow molding procedure, comprises a blow molding mold 10 which is divided into two mold portions or mold halves as indicated at 10a and 10b respectively. The two mold halves 10a and 10b are each releasably mounted on a respective mold holding plate 12a and 12b. Disposed above the mold 10 is an extrusion head 14 which is provided at its underside with a nozzle for extruding a generally tubular preform as indicated at 16. The preform 16 is introduced into the mold 10 while the preform is in a warm-plastic condition, and the preform 16 is expanded in the mold 10 by an increased internal pressure in the mold 10 until the preform bears against the internal wall surface of the mold cavity in the mold 10, the mold cavity being formed by mold cavity portions 18a and 18b in the respective mold halves 10a and 10b.

Figure 1:
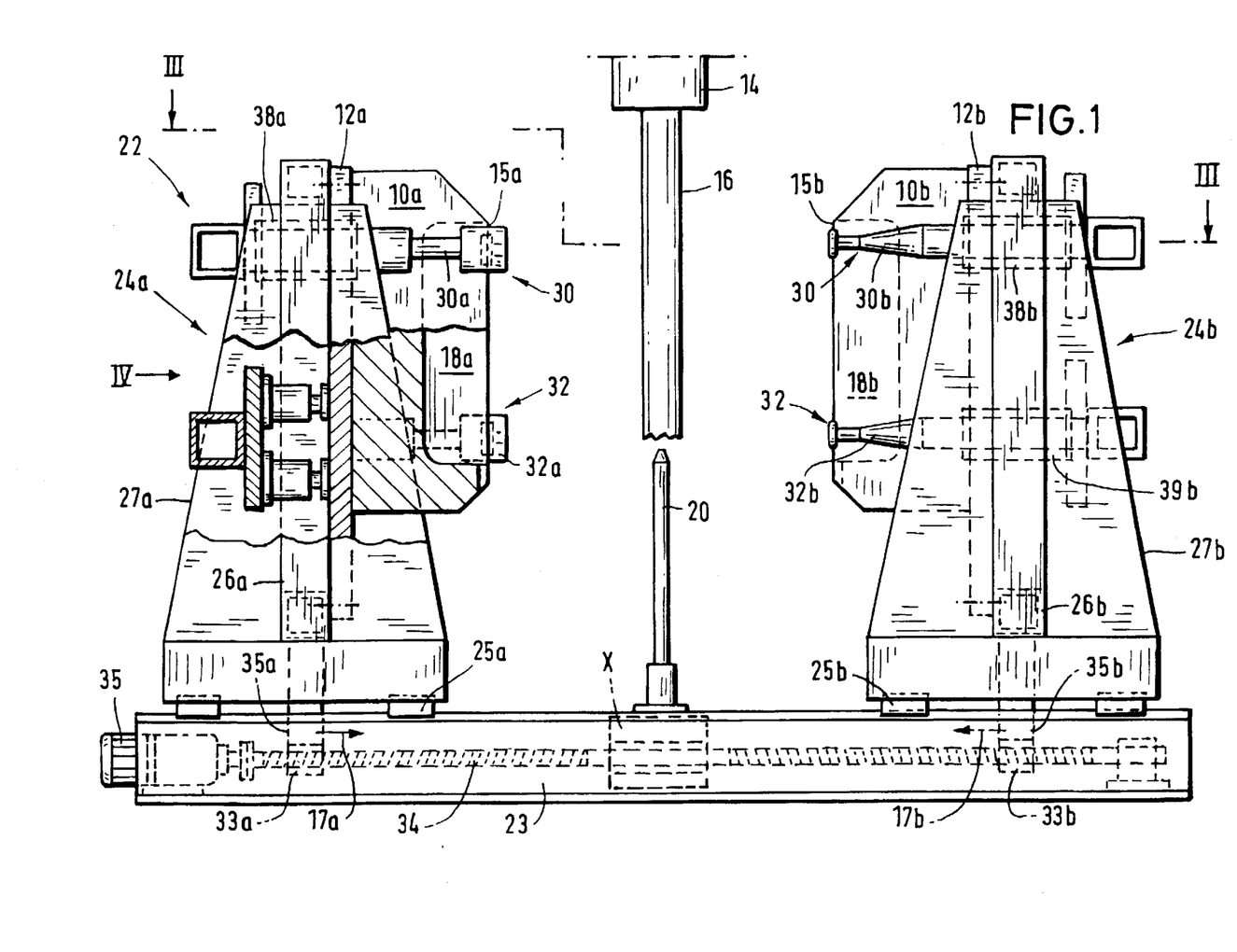
FIG. 1 is a diagrammatic side view of an extrusion blow molding apparatus with the blow molding mold in an open condition.
Figure 2:
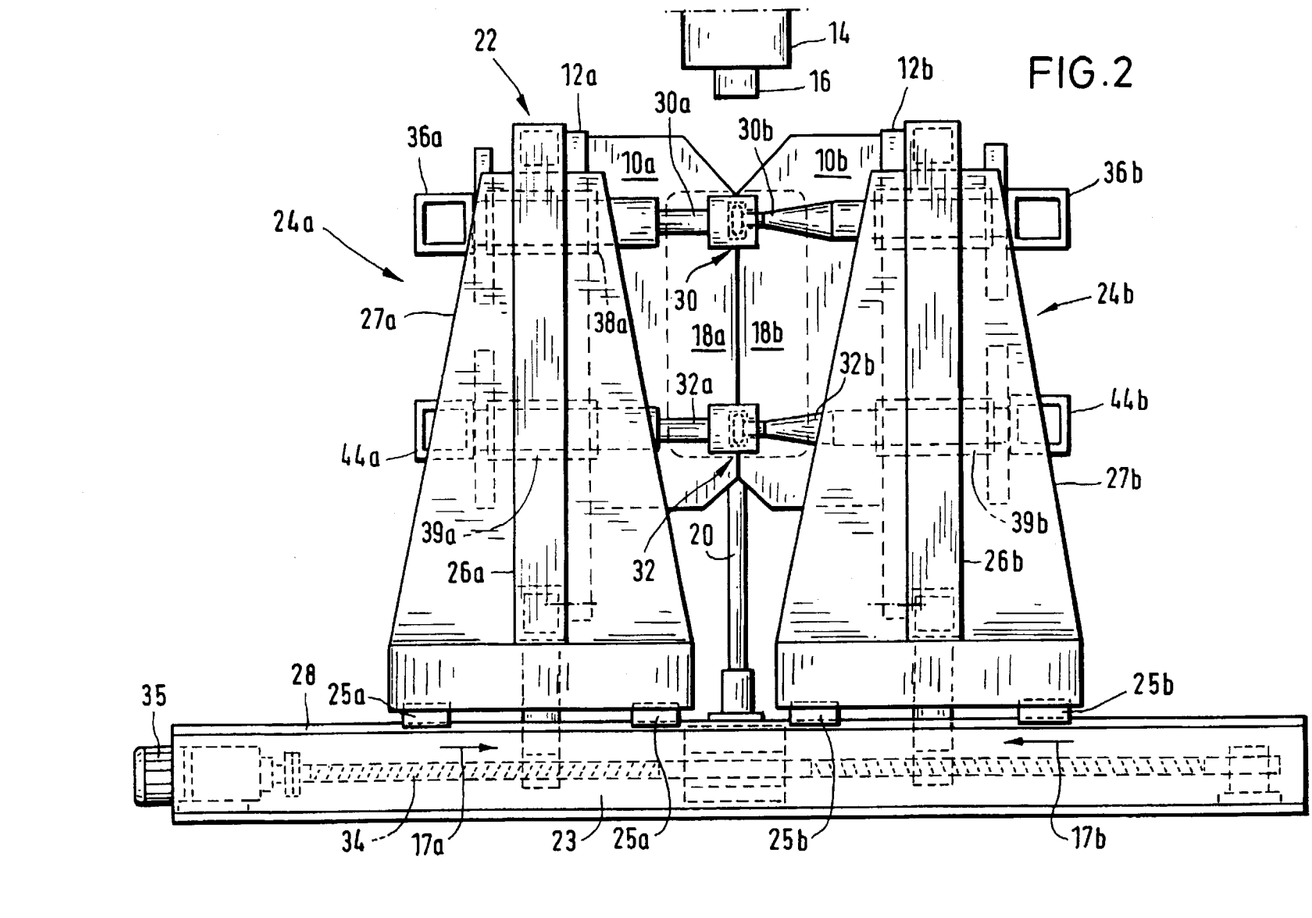
FIG. 2 is a view corresponding to that shown in FIG. 1 with the blow molding mold in the closed condition.

After the preform 16 has reached the length required for the production of a hollow body, the mold 10 which is in an open condition in FIG. 1 is closed by movement of the two mold halves 10a and 10b in the directions of the arrows 17a and 17b, so that the mold halves 10a and 10b are moved into the positions shown in FIG. 2. In the course of the closing movement, the preform 16 is closed off at its upper end by the mold halves 10a and 10b which for that purpose are provided with squeezing-off edges 15a and 15b, with surplus material on the preform 16 being squeezed off by those edges. At the lower end, the preform 16 is pressed around the blowing mandrel or bar 20 which projects from below into the preform 16. Surplus material at that location can also be squeezed off, by the co-operation between the mold halves 10a and 10b and the blowing bar 20. The pressure medium for expanding the preform 16 within the closed mold 10 is supplied by way of the blowing bar 20. It is also possible for the blowing bar 20 or another arrangement for the feed of the pressure medium to be arranged elsewhere, for example in such a fashion that the blowing bar 20 or the other pressure medium feed means projects from above into the mold 10 and into the preform 16 disposed in the mold 10. All the above-indicated operating procedures and arrangements are familiar in this art so that they do not need to be described in fuller detail herein.

The mold 10 is part of a closing support arrangement 22 provided with a base frame structure 23 on which two support portions 24a and 24b are mounted for reciprocating movement. The support portions 24a and 24b carry the mold holding plates 12a and 12b and the mold halves 10a and 10b mounted thereon. The two support portions 24a and 24b each have a respective vertical frame 26a and 26b provided with two side plates 27a and 27b which increase in width from their upper end downwardly, in the mold-closing and opening direction. The base frame structure 23 is provided with guides extending in the mold-closing and opening direction, in the form of rails 28 on which shoes 25a and 25b are slidingly guided. The shoes 25a and 25b are each fixed at the underside to the side plates 27a and 27b.

The reciprocating movement of the two support portions 24a and 24b along the guides 28 is produced by two laterally arranged spindles 34 which are each driven by a respective motor 35. The two support portions 24a and 24b are provided at both sides with downwardly extending projections 35a and 35b which each carry a respective spindle nut as indicated at 33a and 33b respectively. It will be appreciated that rotation of the two spindles 34 causes movement of the two support portions 24a and 24b in the appropriate direction for opening or closing the mold. To produce oppositely directed movements it is only necessary for the screwthreads of the two spindle nuts also to be in opposite relationship. It will be appreciated that it is also possible to use other forms of drive means for producing the mold-opening and closing movements, instead of the spindles 34, for example the hydraulic piston-cylinder units already referred to above.

The support arrangement 22 is provided with first and second locking devices which are arranged at a vertical spacing from each other. Each locking device comprises two locking units 29, 30; 31, 32 arranged at the same height at opposite sides of the blow molding mold 10. The two locking devices are of the same design configuration. Each locking unit 29, 30; 31, 32 comprises two portions 29a, 29b; 30a, 30b; 31a, 31b; 32a, 32b. The two portions 29a and 30a of the locking units 29, 30 are pivotably fixed to the end regions of an upper transverse carrier 36a which is arranged in a substantially horizontal plane in the upper region of the mold holding plate 12a at the side thereof which is remote from the mold half 10a; the upper transverse carrier 36a projects laterally somewhat beyond the mold holding plate 12a, as can be seen in particular from FIG. 3. A transverse carrier 36b is also associated with the mold holding plate 12b in the upper region thereof, at the same height as the transverse carrier 36a. At its two end portions which laterally project beyond the mold holding plate 12b, the transverse carrier 36b is connected pivotably about a vertical axis to a respective portion 29b and 30b of the two locking units 29 and 30.

The portions 31a, 31b; 32a, 32b of the lower locking device are connected in a corresponding manner to one of the transverse carriers 44a and 44b respectively which are disposed at the same height in the lower region of the blow mold molding portions.

Each of the portions 29a, 29b; 30a, 30b; 31a, 31b; 32a, 32b of the locking devices is mounted in a respective bush 38a, 38b, 39a, 39b which is fixed to the respective vertical frame 26a and 26b or one of the side plates 27a, 27b of the support portions 24a and 24b respectively. The arrangement is such that on the one hand the respective portion is guaranteed to be a firm fit in the associated bush, while on the other hand permitting slight movement in the longitudinal direction of the bush. That movement will normally be only a few millimeters at a maximum. The transverse carriers which are respectively connected to the portions 29a, 29b; 30a, 30b; 31a, 31b, 32a, 32b are essentially carried by those portions and therewith also by the respective bushes 38a, 38b; 39a, 39b.

It will be seen from the above-described arrangement that the transverse carriers which are essentially in the form of bar or beam members are parts of the closing support arrangement 22 and consequently participate in the opening and closing movements of the mold halves 10a and 10b. Locking of the mold halves 10a and 10b in the mold-closed position is effected by way of the locking devices, as the locking devices engage the transverse carriers 36a and 36b. So that the forces which in that situation act on the mold holding plates 12a and 12b and therewith also the mold portions 10a and 10b are distributed as uniformly as possible, those forces are transmitted from the transverse carriers 36a, 36b to the respectively associated mold holding plates, with the interposition of force-transmitting means as indicated at 40a–40f in FIG. 4. Each of those force-transmitting means is in the form of a hydraulic piston-cylinder unit whose piston can only perform a short stroke movement. The maximum possible stroke movement does not need to be more than a few millimeters.

Figure 7:
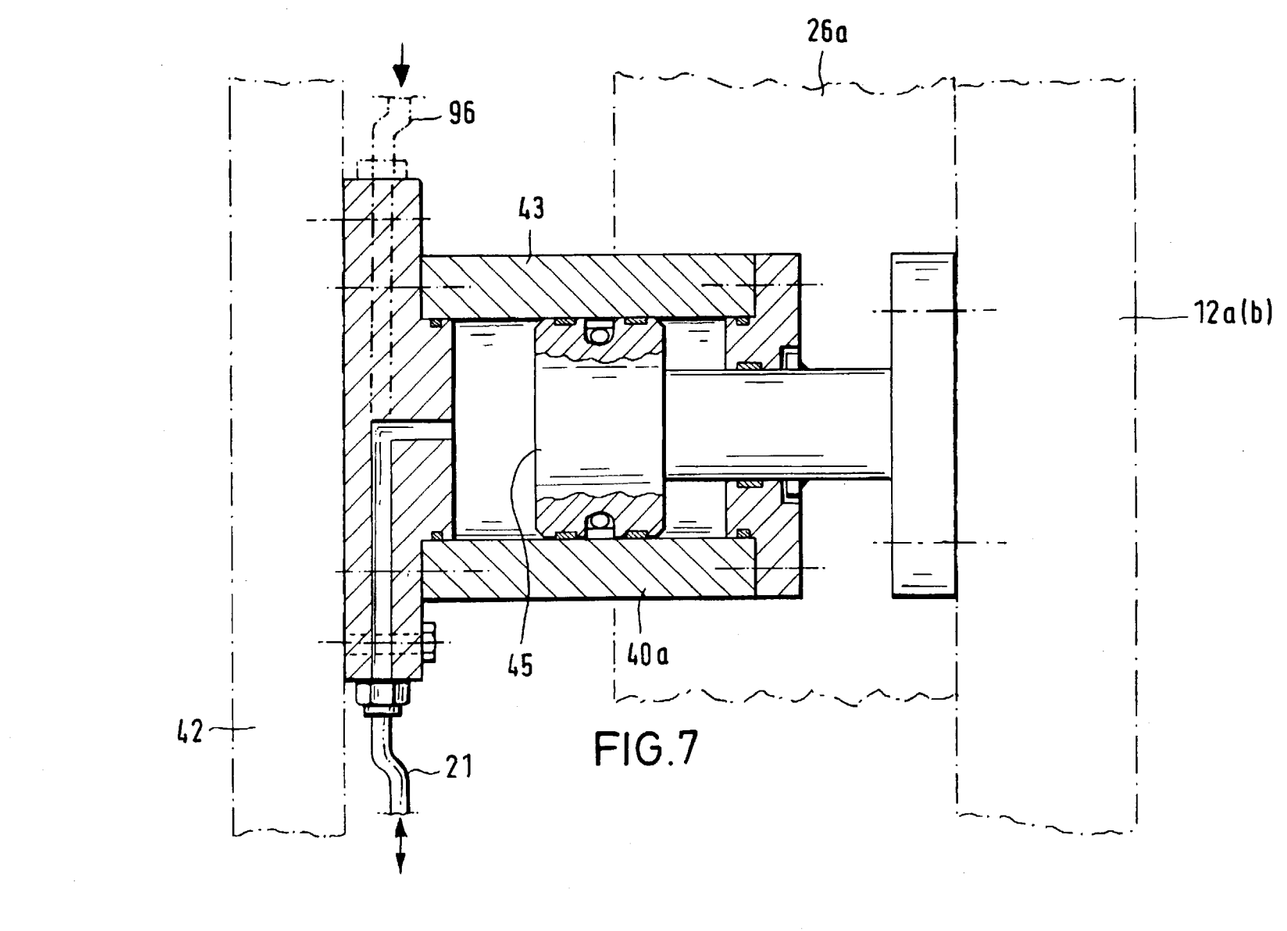
FIG. 7 is a view on a larger scale of a hydraulic force-transmitting means with the parts of another embodiment, which cooperate therewith.

Reference will be directed at this point to FIG. 7 showing a possible design configuration for a hydraulic force-transmitting means of that kind. It will be seen from FIG. 7 that the force-transmitting means comprises a cylinder 43 which bears against the respective transverse carrier 36a or 36b with the interposition of an intermediate plate 42. Guided within the cylinder 43 is a piston 45 which is supported against the respective mold holding plate 12a or 12b.

Figure 4:
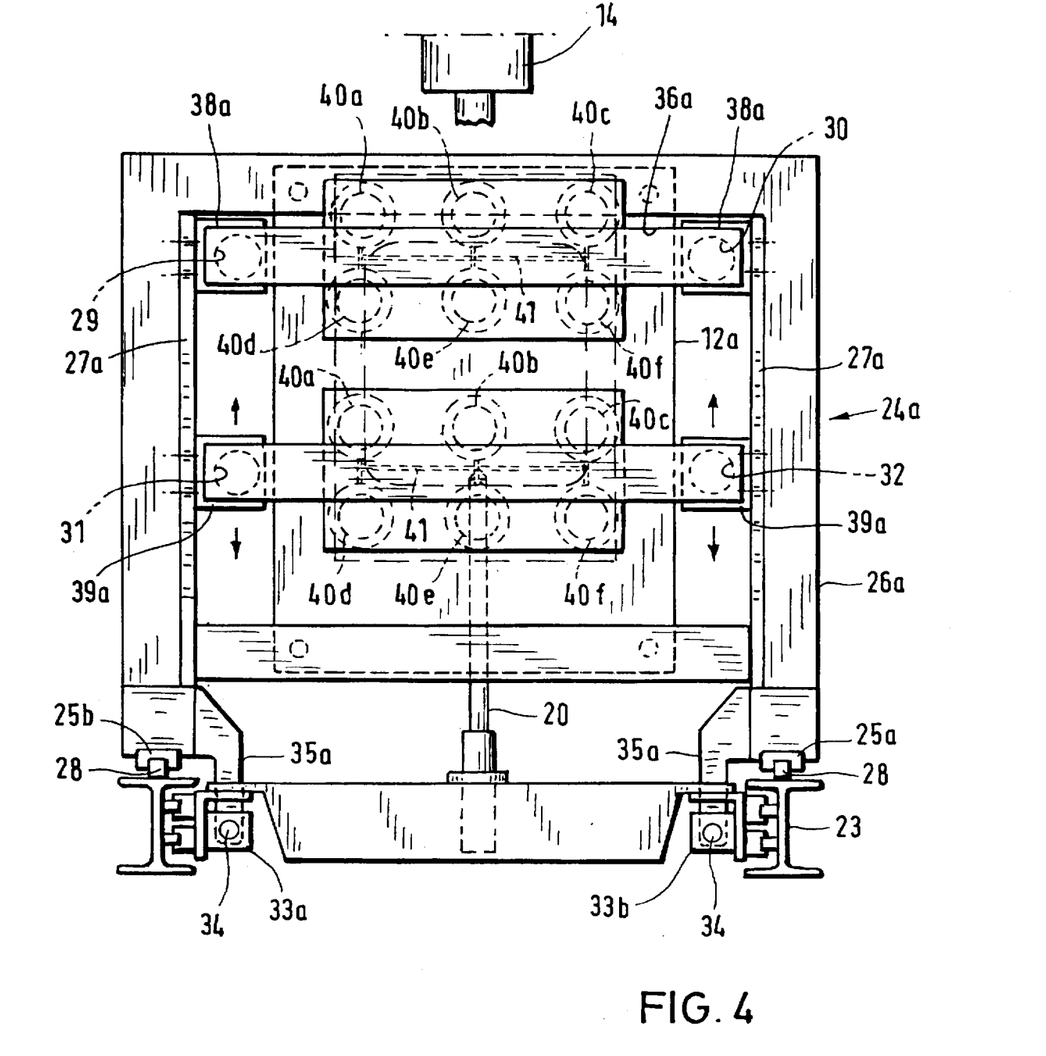
FIG. 4 is a view in the direction of the arrow IV in FIG. 1.

In the construction shown in the drawing, as can be seen more specifically from FIG. 4, six force-transmitting means 40a–40f are associated in pairs with each transverse carrier 36a, 36b; 44a, 44b in such a way that each two force-transmitting means are disposed at a short spacing one above the other, and a respective pair is arranged near one of the lateral edges of the respective mold holding plate 12a or 12b and a respective pair is arranged approximately at the center of the respective mold holding plate, said center being defined by a vertical axis of symmetry. All force-transmitting means 40a–40f which are associated with the same transverse carrier form a group. They are hydraulically connected together by hydraulic lines or conduits 41. Interchange of the hydraulic fluid between the cylinders 43 of the individual force-transmitting means is made possible by way of the lines 41. That interchange also causes the forces which are to be transmitted by the individual force-transmitting means to the respectively associated mold holding plate to be rendered uniform. As the pairs of force-transmitting means 40a, 40d; 40b, 40e; 40c, 40f are overall of a vertical extent which is greater than the vertical extent of the respective transverse carrier, arranged between the respective transverse carrier and the associated group of force-transmitting means is the above-mentioned intermediate plate 42 which however only serves to ensure reliable transmission of force from the respective transverse carrier to the force-transmitting means. More specifically the arrangement in that respect is such that the intermediate plate 42 is fixedly mounted on the respective transverse carrier and the cylinders of the force-transmitting means are fixed to the intermediate plate 42, whereas the pistons of the force-transmitting means are connected to the respective mold holding plate 12a, 12b.

FIGS. 1 and 4 show that the above-described design configuration occurs at all four transverse carriers which are arranged in pairs. The force-transmitting means 40a–40f of each group which is associated with a respective transverse carrier are connected together by lines 41.

In the construction illustrated in the drawing the transverse carriers and therewith also the two locking devices 29, 30; 31, 32 carried thereby are arranged approximately at the height of the regions in which, upon closure of the blow molding mold in the last phase of the closing operation the surplus material is squeezed off the preform 16. Particularly high forces are operative in that situation. By virtue of the adopted arrangement of the transverse carriers and the associated groups of force-transmitting means, the forces are applied approximately at the height level at which they are primarily required. In other words, in that situation, it is possible substantially to avoid the generation of turning moments.

Figure 3:
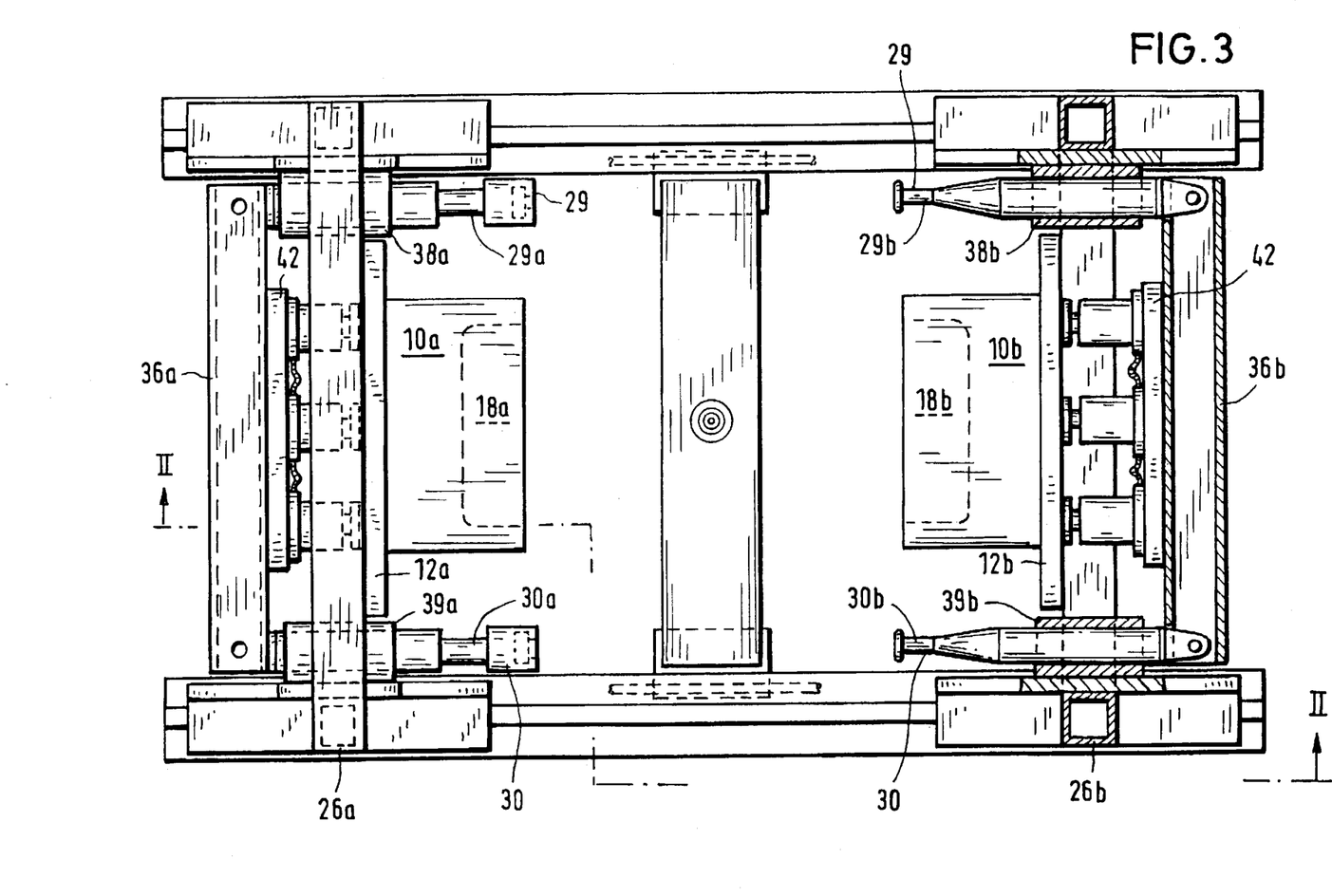
FIG. 3 is a view in the direction of the arrows III—III in FIG. 1.

A corresponding consideration also applies in regard to horizontal distribution of the force-transmitting means of each group. In particular FIGS. 3 and 4 show that the force-transmitting means, in projection in the direction of the arrow 17a or 17b, are arranged approximately in or near the region in which the mold cavity 18a and 18b is also disposed. In that respect, in the illustrated construction the two outer pairs of force-transmitting means 40a, 40d and 40c, 40f are disposed approximately in the regions in which the lateral boundaries of the mold cavity 18a, 18b extend. This is particularly desirable in the situations where, as is frequently the case with hollow bodies of an irregular shape, surplus material has to be squeezed off the preform at both sides or at least at one side, when the mold is closed.

Figure 5:
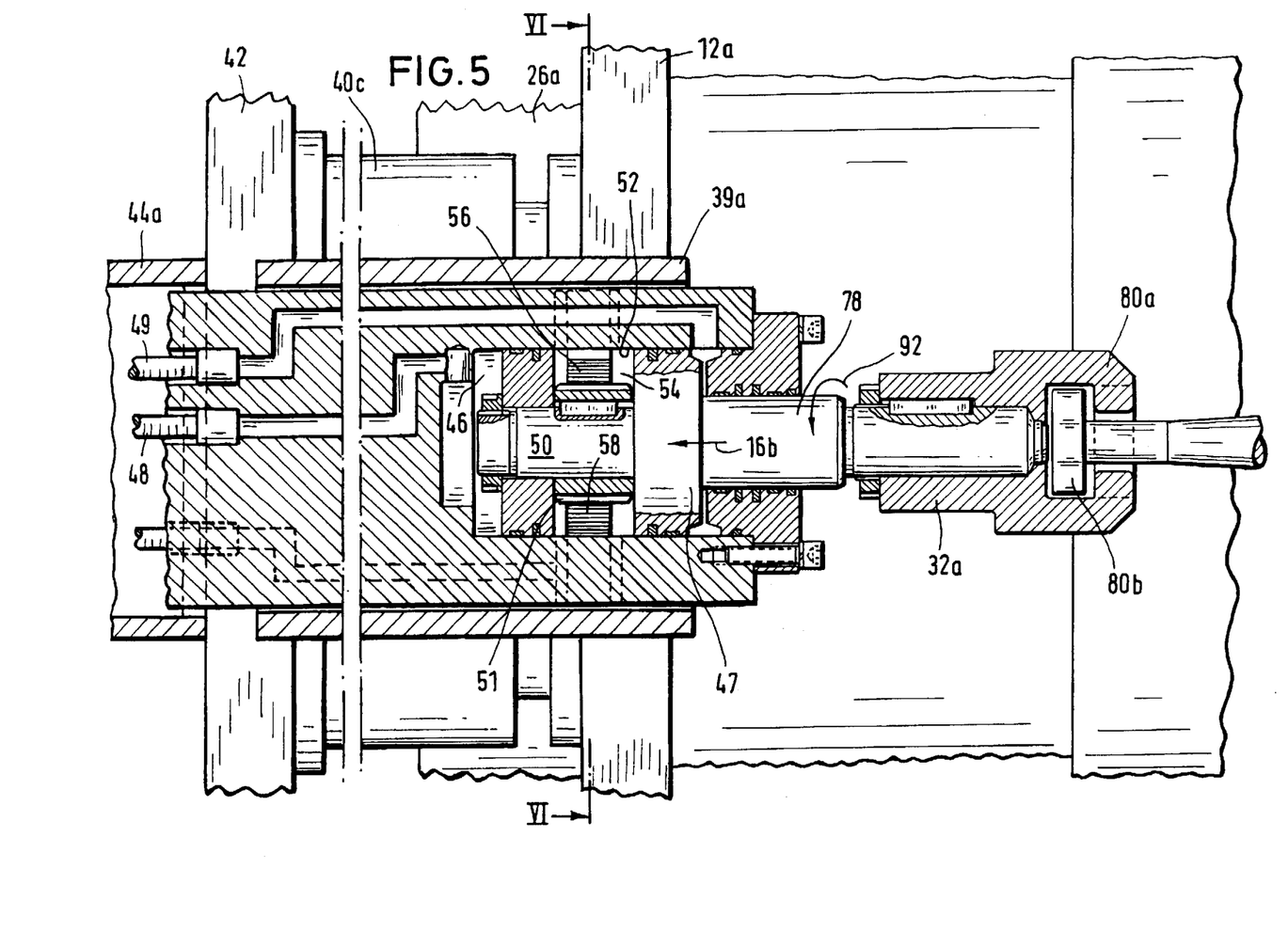
FIG. 5 is a partly sectional view on a larger scale of a locking unit with the two co-operating coupling members in engagement.
Figure 6:
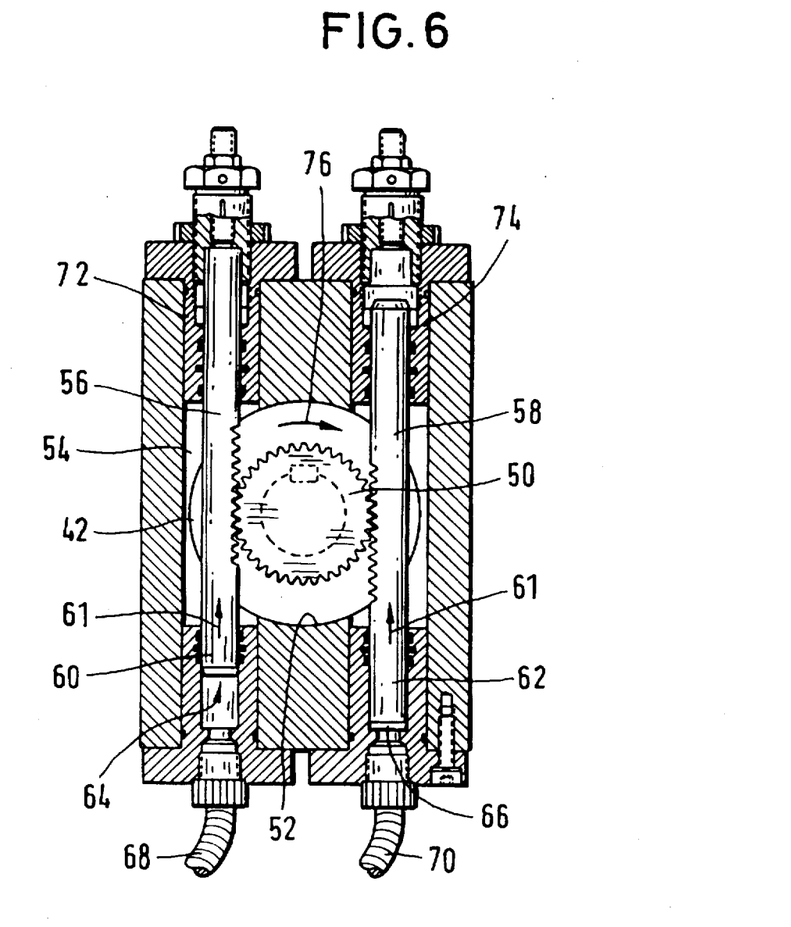
FIG. 6 is a view in section approximately along line VI—VI in FIG. 5.

Reference will now be made to FIG. 5 to see the configuration in particular of the portions 29a, 30a, 31a, and 32a of each locking unit. Each of those locking portions has a cylinder 46, within which a piston 47 is reciprocably guided. The hydraulic pressure medium for acting on the piston 47 is supplied and discharged by way of hydraulic lines 48 and 49 respectively. The piston 47 is provided with a central region 50 of smaller diameter, on which is mounted a toothed wheel 51 which is carried by the piston 47 and which is fixedly connected thereto. The outside diameter of the wheel 51 is so selected that a free space 54 remains between the wall 52 of the cylinder 46 and the outer periphery of the wheel 51. Two racks 56 and 58 extend through the free space 54. As FIG. 6 shows in greater detail, the two racks 56 and 58 which extend vertically in the illustrated embodiment represent a portion or a prolongation of a respective plunger member 60, 62 guided in a respective cylinder 64 or 66. Each of the two cylinders 64 and 66 is connected to a line for the feed or discharge of a pneumatic or hydraulic pressure medium. The end regions of the two racks 56, 58, which are remote from the lines, are guided in bushes 68 and 70 respectively. The two plunger members 60, 62 can only be acted upon by pressure medium at one end as, when one of the two plunger members 60 and 62 is actuated, the respective other plunger member is necessarily moved back into its starting position. FIG. 6 shows the components in a position at the end of a stroke movement of the rack 56 in the direction of the arrow 61 and consequently at the end of a rotary movement of the piston 47 and therewith the wheel 51 in the direction of the arrow 76.

At its side remote from the respective transverse carrier, fixedly mounted on the piston 47 is a connecting portion 78 which, at its end remote from the piston 47, carries the coupling member 80a of the locking portion 32a which is illustrated here. The coupling member 80a co-operates with a coupling member 80b of the portion 32b of the locking unit, in a manner yet to be described herein. The receiving coupling member 80a is provided in its end face, at its free end, with an opening which is of approximately cross-shaped cross-sectional configuration. The cross-section of the coupling member 80b which is to be introduced into and co-operate with the receiving coupling member 80a is so adapted to the cross-sectional shape of the opening in the receiving coupling member 80a so that, when the receiving coupling member 80a is in the appropriate angular position, the coupling member 80b can be introduced into the coupling member 80a through the opening therein, in the course of the mold-closing movement. Thereafter, the receiving coupling member 80a is rotated about its longitudinal axis or about the longitudinal axis of the locking portion, thus providing a positively locking connection between the two coupling members. That position is shown in FIG. 5.

In the course of the closing movement of the mold portions 10a and 10b therefore the two coupling members 80a and 80b are firstly brought into engagement with each other. That relative position between the receiving coupling member 80a and the coupling member 80b is reached in the last phase of the closing movements of the two mold portions when the two mutually facing surfaces of the mold portions 10a and 10b are only at a spacing from each other of a few millimeters, for example between 5 and 20 millimeters. After that position is reached, the rack 58 is displaced in the direction indicated by the arrow 61 in FIG. 6, by virtue of pressure medium being introduced into the cylinder 66 to act on the plunger member 62 by way of the feed line 70. In that way, the wheel 51 and therewith the piston 47 are rotated in the direction indicated by the arrow 92 in FIG. 5 through a distance of an arcuate extent which results in a positively locking connection being made between the two coupling members 80a and 80b. That positively locking connection permits the transmission of axial forces from the one portion 32a of the locking device to the other portion 32b thereof, and vice-versa. Thereupon, the piston 47 is acted upon by pressure medium introduced by way of the line 49 so that the piston 47 and the coupling member 80a connected thereto are displaced in the direction indicated by the arrow 16b in FIG. 5 whereby the two coupling members 80a and 80b and therewith the two mold portions 10a and 10b are braced and locked relative to each other.

It will be noted that it is important in this respect that it is not just the closing force, that is to say that force which resists the blow molding pressure within the mold 10, that can be applied or at least considerably increased by way of the locking devices, using comparatively simple means. On the contrary, there is also the above-mentioned possibility of using the locking devices in the last phase of the mold-closing procedure to apply the forces which are required for portions of the preform which are disposed outside the mold cavity 18a and 18b to be squeezed off the preform 16 by virtue of being surplus material. In that operation, a welded seam may possibly also be formed at the same time. In many cases, those procedures mean that it is necessary to comply with certain conditions, in particular in regard to the way in which the closing procedure takes place. In this respect, attention is directed to German patent specification No 23 64 510 in which the conditions and interrelationships and other factors involved are described and explained. Use of the locking devices for the operation of squeezing surplus material off the preform 16 makes it readily possible to comply with those conditions.

The structure of the illustrated apparatus having been described, consideration will now be given to the mode of operation thereof.

The apparatus structure according to the invention and the process according to the invention for producing hollow bodies provides that the forces transmitted to the blow molding mold halves by the locking devices are rendered more uniform, with the result that irregular loadings on the blow molding mold portions, which give rise to the above-described disadvantages and shortcomings, can be at least substantially avoided. It will admittedly still be possible for the transverse carriers 36a, 36b, 44a, 44b, under the effect of the very high mold-closing forces which can be more than 100 t, to experience bending phenomena which naturally may be only a few millimeters at a maximum. Because of the provision of the force-transmitting means 40a–40f however bending of the respective transverse carrier results in correspondingly stronger actuation of the outwardly disposed force-transmitting means 40a, 40d and 40c, 40f respectively, which results in displacement of a corresponding part of the hydraulic fluid in those force-transmitting means by way of the lines 41 into the two force-transmitting means 40b, 40c which are at the center, thus automatically providing for equalization of the forces acting on the mold holding plates and therewith the mold portions, so that those forces are rendered more uniform. It will be apparent that a very substantial force-regularization effect can be achieved by adopting a suitable number of force-transmitting means and by virtue of a suitable arrangement thereof, in dependence on the respective operating conditions involved. A substantial advantage is undoubtedly the fact that the forces acting on the mold portions can be regularized in that way using simple means. In addition, if the apparatus involves suitable adjustability of the co-operating components, that is to say more especially the transverse carriers 36a, 36b, 44a, 44b, and the force-transmitting means 40a–40b, adaptation to different factors in respect of size of the blow molding mold, the position of the mold cavity or cavities, the position of the squeezing-off edges etc, is readily possible.

Reference will now be made to FIG. 7 showing a force-transmitting means connected by way of a compensating or equalizing line 21 to further force-transmitting means which belong to the same group. This embodiment has a particularity insofar as it is connected by way of a line 96 to a source for a hydraulic pressure medium by which the force-transmitting means which are connected together by way of the line 21 can be additionally hydraulically actuated in order thereby to produce displacement, which is controllable from the exterior, of the pistons 45 of the force-transmitting means of a group. Such a design configuration may be desirable when the force-transmitting means are also intended to serve to assist or possibly exclusively produce the displacement of the blow molding mold portions in the last phase of the mold-closing procedure, in order in that way to apply the forces required for squeezing surplus material off the preform, as already mentioned above. In that case there would be no need for the locking units to have longitudinally displaceable pistons as indicated at 47 in FIG. 5, as the function thereof is performed by the force-transmitting means. It will be appreciated however that it is also possible to provide both the longitudinally displaceable pistons 47 and force-transmitting means which are controllable from the exterior, in which case the effects of both those components would supplement each other. Possibly the pistons of the force-transmitting means would have to involve a somewhat longer stroke movement, in the event of being additionally actuated from the exterior. That consideration depends on the travel movement which the respective blow molding mold portion has to cover in the operation of squeezing surplus material off the preform.

In general it will be desirable for each force-transmitting means to provide a connection to the additional source for a hydraulic pressure medium by way of a separate line 96 in order thereby to achieve for all force-transmitting means conditions which are as closely identical as possible, in respect of length and cross-section of the flow paths and/or other influencing factors which determine the pressure conditions.

It will be appreciated that the above-described apparatuses for the production of hollow bodies of thermoplastic material and the process for producing hollow bodies of thermoplastic material from a preform using a blow molding procedure have been set forth solely by way of example and illustration of the principles of the present invention and that various modifications and alterations may be made therein without thereby departing from the spirit and scope of the present invention.

What is claimed is:

1. In a process for the production of hollow bodies of thermoplastic material from a preform by a blow molding procedure using a blow molding mold comprising at least first and second portions, and at least one drive means by which the mold portions are moved between a position in which the blow molding mold is opened and a position in which the blow molding mold is closed, and using at least one means by which the mold portions are acted upon by forces acting in the closing direction and are locked together at the latest when the blow molding mold is in the closed condition, at least one portion of the locking means being associated with each of the mold portions to be locked together, and the portions of the locking means being brought into engagement with each other by way of releasable coupling members, the improvement that the forces applied in the closing direction by the at least one locking means are transmitted to at least one of the mold portions with the interposition of at least first and second hydraulic force-transmitting means which are at a spacing from each other and the at least first and second hydraulic force-transmitting means are hydraulically connected together.

2. A process according to claim 1 wherein at least a part of the forces is transmitted by the force-transmitting means to that region of the mold portion which in a projection in the closing direction is within the at least one mold cavity of the blow molding mold.

3. A process according to claim 1 wherein at least a part of the forces is transmitted by the force-transmitting means to that region of the mold portion which serves to carry out a squeezing-off operation on the preform.

4. A process according to claim 1 wherein the system comprising at least first and second hydraulic force-transmitting means and the hydraulic line connecting same together is acted upon in the closing direction by an additional hydraulic pressure source, at least in the last phase of closure of the blow molding mold.

5. Apparatus for producing hollow bodies of thermoplastic material in a blow molding procedure having a closure support means, a blow molding mold carried by the support means and comprising at least first and second portions, and at least one drive means for moving the mold portions between a position in which the mold is opened and a position in which the mold is closed, and having at least one locking means by which the mold portions are acted upon by forces acting in the mold-closing direction and are locked together at least when the mold is in the closed condition, the locking means having at least a portion operatively associated with each of the mold portions to be locked together and the portions of the locking means having releasable coupling members adapted for engagement with each other when the mold is closed, at least first and second hydraulic force-transmitting means which are at a spacing from each other, for transmitting the forces applied in the mold-closing direction by the locking means to at least one of the mold portions, and means for hydraulically connecting the hydraulic force-transmitting means together.

6. Apparatus according to claim 5 wherein the mold has at least one mold cavity and at least one of the hydraulic force-transmitting means is arranged, in a projection in the mold-closing direction of the mold portions, in the region of the at least one mold cavity of the mold.

7. Apparatus according to claim 5 wherein the mold portions have at least one squeezing-off edge and at least a portion of the force-transmitting means is arranged, in a projection in the mold-closing direction of the mold portions, in the region of the squeezing-off edge.

8. Apparatus according to claim 5 including a mold holding plate carrying each of the mold portions and wherein the locking means is connected to the mold holding plates and the hydraulic force-transmitting means are arranged at least between a mold portion and the mold holding plate carrying same.

9. Apparatus according to claim 8 including at least one transverse carrier on the mold holding plates carrying the mold portions, each transverse carrier projecting beyond the respective mold portion and carrying the portions of the locking means which are associated with the associated mold portion, at least one of the transverse carriers being connected to the mold holding plate associated therewith, with the interposition of at least two spaced-apart hydraulic force-transmitting means which are hydraulically connected together.

10. Apparatus according to claim 9 wherein each transverse carrier projects laterally beyond the respective mold portion.

11. Apparatus according to claim 9 wherein each transverse carrier projects upwardly and downwardly beyond the respective mold portion.

12. Apparatus according to claim 10 wherein each transverse carrier projects beyond the respective mold holding plate.

13. Apparatus according to claim 11 wherein each transverse carrier projects beyond the respective mold holding plate.

14. Apparatus according to claim 9 wherein at least three hydraulic force-transmitting means are arranged along the longitudinal extent of the transverse carrier.

15. Apparatus according to claim 8 including an intermediate plate arranged between the transverse carrier and the associated mold holding plate and wherein the hydraulic force-transmitting means are arranged between the mold holding plate and the intermediate plate.

16. Apparatus according to claim 15 wherein the intermediate plate is of greater width than the transverse carrier.

17. Apparatus according to claim 8 wherein at least two spaced-apart transverse carriers are associated with at least one of the mold holding plates and a group of hydraulic force-transmitting means is associated with each transverse carrier, and including means hydraulically connecting the force-transmitting means of each group together.

18. Apparatus according to claim 9 wherein the at least two transverse carriers of each mold holding plate are arranged to extend parallel to each other.

19. Apparatus according to claim 9 wherein the hydraulic force-transmitting means of each transverse carrier are arranged in first and second mutually parallel rows.

20. Apparatus according to claim 9 wherein the at least two transverse carriers of each mold holding plate are arranged to extend parallel to each other.

21. Apparatus according to claim 9 wherein the transverse carriers are supported independently of the mold holding plates on the support means.

22. Apparatus according to claim 9 including means mounting at least one of the transverse carriers displaceably relative to the mold portions, with the respective force-transmitting means.

23. Apparatus according to claim 9 including means mounting at least one of the transverse carriers displaceably relative to the mold holding plates, with the respective force-transmitting means.

24. Apparatus according to claim 21 the force-transmitting means are carried by the transverse carriers.

25. Apparatus according to claim 21 wherein the force-transmitting means are carried by the intermediate plates which are fixed to the transverse carriers.

26. Apparatus according to claim 5 including a hydraulic pressure source provided with an additional drive, wherein the system comprising at least two hydraulic force-transmitting means and the hydraulic line connecting them together is adapted to be connected to the hydraulic pressure source provided with an additional drive.

27. Apparatus according to claim 26 wherein each of the hydraulic force-transmitting means of a group is adapted to be connected directly to the additional hydraulic pressure source.

* * * * *